(54) APPARATUS AND METHOD OF SEISMIC SENSING SYSTEMS USING FIBER OPTICS

(75) Inventors: Jian-Qun Wu, Houston, TX (US); Alan D. Kersey, S. Glastonbury; Robert J. Maron, Cromwell, both of CT (US)

(73) Assignee: CiDra Corporation, Wallingford, CT (US)

( * ) Notice: Subject to any disclaimer, the term of this patent is extended or adjusted under 35 U.S.C. 154(b) by 0 days.

(21) Appl. No.: 09/145,624

(22) Filed: Sep. 2, 1998

Related U.S. Application Data

(63) Continuation-in-part of application No. 08/933,544, filed on Sep. 19, 1997, now Pat. No. 5,986,749.

(51) Int. Cl.[7] .................................................. G01N 21/00
(52) U.S. Cl. ............................................................ 356/73.1
(58) Field of Search ............................ 356/73.1, 32, 360, 356/358, 35.5; 250/227.14, 227.16, 227.24, 227.11; 385/28, 37, 50, 32, 12, 10, 13; 73/587, 602, 592, 626, 628, 653, 514.26

(56) References Cited

U.S. PATENT DOCUMENTS

| | | |
|---|---|---|
| 2,301,326 | 11/1942 | Reistle, Jr. . |
| 2,824,378 | 2/1958 | Stokes . |
| 2,894,200 | 7/1959 | Szasz . |
| 3,086,167 | 4/1963 | Chaney et al. . |
| 4,162,400 | 7/1979 | Pitts, Jr. . |
| 4,167,111 | 9/1979 | Spuck, III . |
| 4,226,288 | 10/1980 | Collins, Jr. . |
| 4,389,645 | 6/1983 | Wharton . |
| 4,390,974 | 6/1983 | Siems . |
| 4,442,842 | 4/1984 | Baba . |
| 4,455,869 | 6/1984 | Broussard et al. . |
| 4,534,222 * | 8/1985 | Finch et al. ............................ 73/653 |
| 4,594,691 | 6/1986 | Kimball et al. . |
| 4,610,006 | 9/1986 | MacDonald . |
| 4,700,803 | 10/1987 | Mallett et al. . |
| 4,703,460 | 10/1987 | Kurkjian et al. . |
| 4,829,486 | 5/1989 | Broding . |
| 4,852,067 | 7/1989 | White . |
| 4,950,883 | 8/1990 | Glenn . |

(List continued on next page.)

FOREIGN PATENT DOCUMENTS

| | | |
|---|---|---|
| 0434030 | 6/1991 | (EP) . |
| 9938048 | 7/1999 | (WO) . |

*Primary Examiner*—Frank G. Font
*Assistant Examiner*—Tu T. Nguyen
(74) *Attorney, Agent, or Firm*—Ware, Fressola, Van Der, Sluys & Adolphson LLP

(57) ABSTRACT

The present invention provides a seismic sensing system having at least one sensor, transducer, optical source and detection unit, optical fiber and measurement unit. The sensor responds to a seismic disturbance, for providing a sensor signal containing information about the seismic disturbance. The sensor may be a geophone that detects vibrations passing though rocks, soil etc, and provides an electrical voltage sensor signal. The transducer responds to the sensor signal, for providing a transducer force containing information about the sensor signal. The transducer may be a piezoelectric, magnetostrictive or electrostrictive transducer. The optical source provides an optical signal through the fiber. The optical fiber responds to the transducer force, changes an optical parameter or characteristic of the optical signal depending on the change in length of the optical fiber, for providing a transduced optical signal containing information about the transducer force. The optical fiber may have one or more fiber Bragg Gratings therein arranged in relation to the transducer. The measurement unit responds to the transduced optical signal, for providing a measurement unit signal containing information about the seismic disturbance.

27 Claims, 6 Drawing Sheets

U.S. PATENT DOCUMENTS

| | | |
|---|---|---|
| 4,951,267 | 8/1990 | Chang et al. . |
| 4,951,677 | 8/1990 | Crowley et al. . |
| 4,996,419 | 2/1991 | Morey . |
| 5,007,705 | 4/1991 | Morey et al. . |
| 5,097,838 | 3/1992 | Hirooka et al. . |
| 5,467,212 | 11/1995 | Huber . |
| 5,495,547 | 2/1996 | Rafie et al. . |
| 5,497,233 | 3/1996 | Meyer . |
| 5,510,582 | 4/1996 | Birchak et al. . |
| 5,623,455 | 4/1997 | Norris . |
| 5,626,192 | 5/1997 | Connell et al. . |
| 5,675,674 | 10/1997 | Weis . |
| 5,731,550 | 3/1998 | Lester et al. . |
| 5,737,278 | 4/1998 | Frederick et al. . |
| 5,804,713 | 9/1998 | Kluth . |
| 5,808,779 | 9/1998 | Weis . |
| 6,160,762 * | 12/2000 | Luscombe et al. .................. 367/149 |

* cited by examiner

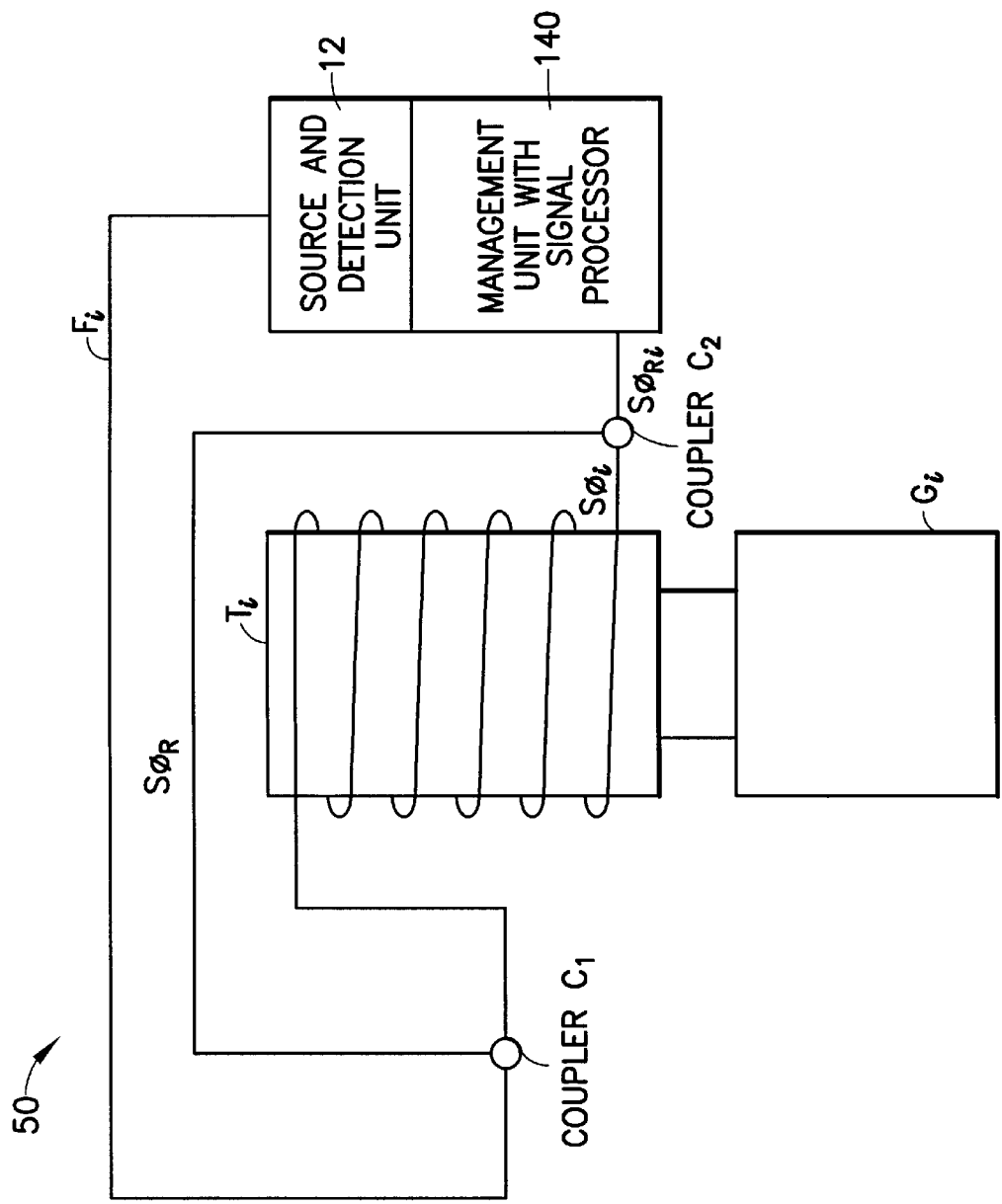

APPARATUS AND METHOD OF SEISMIC SENSING SYSTEMS USING FIBER OPTICS

RELATED APPLICATIONS

This is a continuation-in-part application of U.S. patent application Ser. No. 08/933,544, filed Sep. 19, 1997, U.S. Pat. No. 5,986,749 and hereby incorporated by reference.

BACKGROUND OF INVENTION

1. Technical Field

The present invention relates to a distributed sensing system; and more particularly, to a distributed seismic sensing system for sensing seismic disturbances and other phenomenon.

2. Description of the Prior Art

Seismic sensing systems are known in the art. For example, U.S. Pat. No. 5,623,455), issued to Norris.

One disadvantage of Norris's seismic data acquiring system is that the recording units RU and data acquisition units DAU use batteries which are expensive and time consuming to replace, and the recording units RU and data acquisition units DAU are also heavy devices that are not easily handled during deployment.

Moreover, the use of a fiber having fiber Bragg Gratings in combination with a piezoelectric transducer is shown and described in U.S. Pat. No. 5,675,674, issued to Weis, entitled "Optical Fiber Modulation and Demodulation System," hereby incorporated by reference. See also U.S. patent application Ser. No. 08/933,544, filed Sep. 19, 1997, U.S. Pat. No. 5,986,749 hereby incorporated by reference, which shows and describes a fiber optic sensing system for an oil logging production system having a sensor element with an optical fiber and fiber Bragg Gratings, a piezoelectric transducer, a photo detector, and electroplates.

SUMMARY OF THE INVENTION

The present invention provides a seismic sensing system having a sensor, a transducer, an optical source and detection unit, an optical fiber and a measurement unit.

The sensor responds to a seismic disturbance, for providing a sensor signal containing information about the seismic disturbance. The sensor may be a geophone that detects vibrations passing though rocks, soil, etc., and provides an electrical sensor signal.

The transducer responds to the sensor signal, for providing a transducer force in the form of an expansion or contraction force that contains electromechanical information about the sensor signal. The transducer may be a piezoelectric, magnetostrictive or electrostrictive transducer that converts electrical energy into mechanical energy, and vice versa.

The optical source and detection unit provides an optical signal through the optical fiber. The optical signal may be a broadband or narrowband signal depending on whether a wavelength or time division multiplexing signal processing scheme is used.

The optical fiber responds to the transducer force, changes the phase or wavelength of the optical signal depending on the change in length of the optical fiber, for providing a transduced optical signal containing information about the transducer force. In effect, the optical fiber converts electromechanical energy from the transducer into optical energy by changing a fundamental characteristic and parameter such as the phase of the optical signal being transmitted or reflected through the optical fiber. The optical fiber is wrapped around the transducer and affixed thereon, for example by bonding. The optical fiber expands and contracts along with the transducer, which causes the change in the length of the optical fiber, which in turn causes the change in the phase of the optical signal. The optical fiber may also have one or more fiber Bragg Gratings therein which change the wavelength of the optical signal depending on the change in length of the fiber Bragg Grating. A fiber Bragg Grating pairs may also be arranged on a part of the optical fiber not bonded to the transducer when a cavity approach is used with the transducer arranged between the fiber Bragg Grating pair. In summary, the electrical voltage signal from the geophone causes the transducer to stretch or contract the optical fiber and change in the length of the fiber, which in turn causes a change of the phase or wavelength of the optical signal being transmitted or reflected through the optical fiber.

The measurement unit responds to the transduced optical signal, for providing a measurement unit signal containing information about the seismic disturbance. The measurement unit converts the transduced optical signal into the information about the seismic disturbance by detecting and processing the change in the phase or wavelength of the optical signal.

The seismic sensing system will typically have an array of geophones. Each geophone is connected to a respective piezoelectric, magnetostrictive or electrostrictive transducer, or the like. Each fiber Bragg Grating pair may have a respective wavelength $\lambda_1, \lambda_2, \ldots, \lambda_n$, for providing a multiplexed fiber Bragg Grating optical signal containing information about changes in the optical fiber caused by the electromechanical force from the respective piezoelectric, magnetostrictive or electrostrictive transducer.

The present invention provides important advantages over the seismic sensing system of the aforementioned prior art patent to Norris. First, the transducer and optical fiber combination is a passive electrical element that is economical because it requires no batteries or time consuming and expensive battery replacement, and is also lightweight and easily handled during deployment of the seismic sensing system. Because of this, the seismic sensing system provides a much less cumbersome way for sensing and multiplexing seismic disturbances with a high channel count using optical fiber. Second, since voltage measurements are effectively made at the sensing locations, the seismic sensing system of the present invention does not suffer from the problem of signal attenuation. In operation, the electrical voltage signal is electro-optically converted into an optical phase or wavelength signal that is not adversely affected by amplitude attenuation as long as the amplitude of the light reaching the measurement unit is above some minimum value. Therefore, the voltage signal is effectively digitized at the sensor location without practically any quantization error. The optical detector system of the measurement unit and the property of the piezoelectric, magnetostrictive or electrostrictive transducer determine the accuracy of the voltage measurement.

The present invention, therefore, can be used in applications other than seismic sensing.

The invention will be fully understood when reference is made to the following detailed description taken in conjunction with an accompanying drawing.

BRIEF DESCRIPTION OF THE DRAWING

The drawing includes the following:

FIG. 3 is a diagram of an alternative seismic sensing system using a coupler-based interferometer technique.

DETAILED DESCRIPTION OF THE INVENTION

Figure 1:
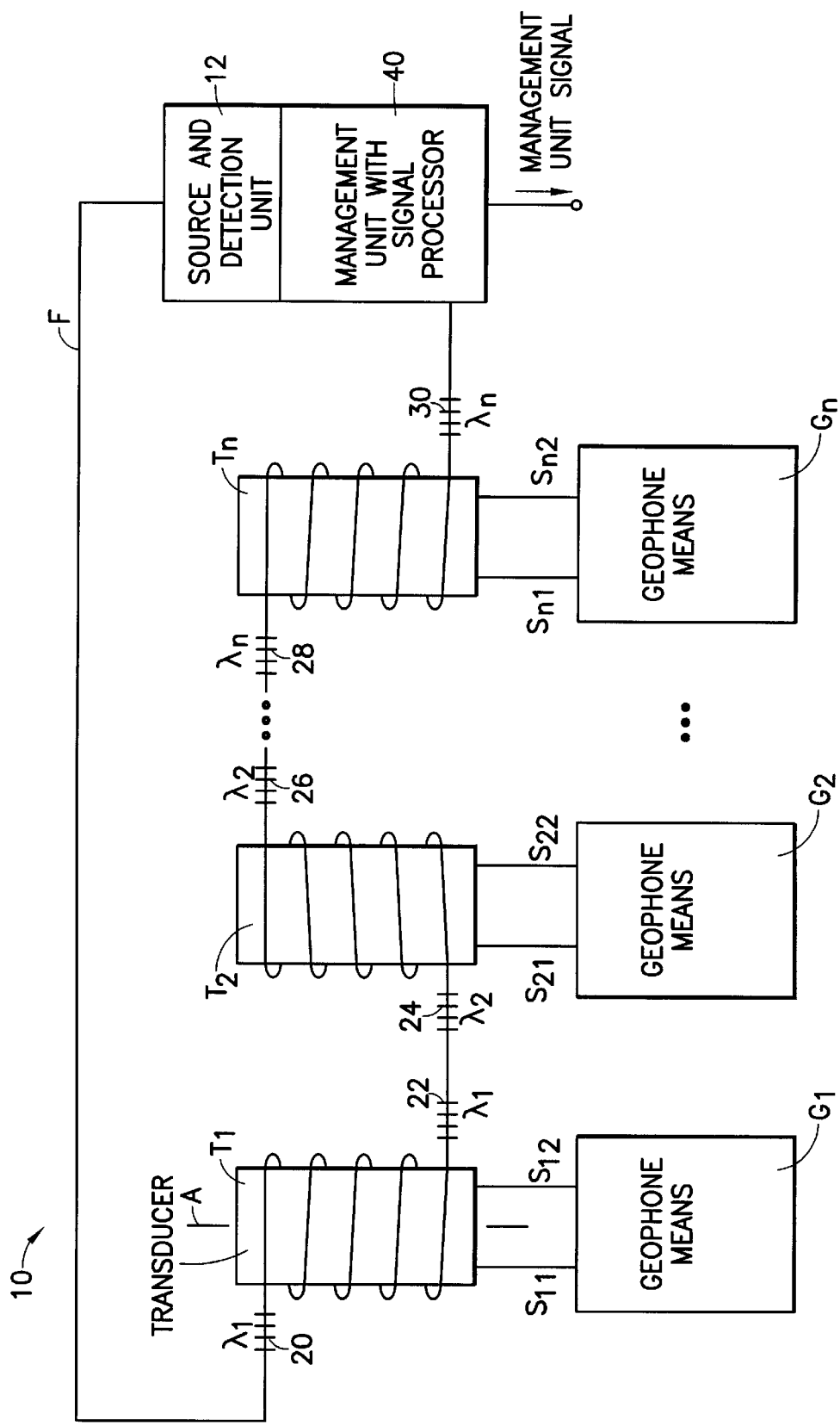
FIG. 1 is a diagram of a seismic sensing system that is the subject matter of the present invention.

FIG. 1 shows a seismic sensing system generally indicated as 10 having geophones $G_1, G_2, \ldots, G_n$, transducers $T_1, T_2, \ldots, T_n$, an optical source and detection unit 12, an optical fiber F having pairs of fiber Bragg Grating therein 20, 22; 24, 26; 28, 30 and a measurement unit 40.

The geophones $G_1, G_2, \ldots, G_n$, respond to a seismic disturbance, for providing geophone electric signals $S_{11}, S_{12}; S_{21}, S_{22}; \ldots; S_{n1}, S_{n2}$ containing information about the seismic disturbance. The geophones $G_1, G_2, \ldots, G_n$ are known in the art, and the scope of the invention is not intended to be limited to any particular kind thereof. The geophones $G_1, G_2, \ldots, G_n$ are passive electrical devices that requires no electrical power for producing an electrical geophone signal. The scope of the invention is also not intended to be limited to only a sensor such as a geophone.

The transducers $T_1, T_2, \ldots, T_n$ respond to the geophone electric signals $S_{11}, S_{12}; S_{21}, S_{22}; \ldots; S_{n1}, S_{n2}$, for providing mechanical transducer forces in the form of transducer expansions and contractions containing information about the plurality of geophone electric signals. As shown in FIG. 1, the transducer $T_1$ has a transducer axis A (See also FIG. 2). The transducers are known in the art, include both piezoelectric and magnetostrictive transducers, and are electrically passive elements. The scope of the invention is not intended to be limited to any particular kind of transducer. In operation, the transducers $T_1, T_2, \ldots, T_n$ respond to the geophone electric signals $S_{11}, S_{12}; S_{21}, S_{22}; \ldots; S_{n1}, S_{n2}$, and physically deform by expanding or contracting. Embodiments are envisioned using any transducer that responds to any electrical signal, and changes some physical parameter or characteristic like its mechanical shape that can be sensed by an optical fiber with a fiber Bragg Grating or fiber Bragg Grating pairs, or a coupler-based system.

The optical source and detection unit 12 provides an optical signal, which may be a broadband or narrowband signal depending on the particular application, as discussed below. The optical source and detection unit 12 is known in the art; and the scope of the invention is not intended to be limited to any particular kind of optical source, or any particular broadband optical source signal.

The optical fiber F has fiber Bragg Grating pairs 20, 22; 24, 26; 28, 30 each with a respective wavelength $\lambda_1, \lambda_2, \ldots, \lambda_n$. The optical fiber F responds to the electromechanical force of the transducers $T_1, T_2, \ldots, T_n$, changes the phase of the optical signal depending on the change in length of the optical fiber, and provides pairs of fiber Bragg Grating optical signals containing multiplexed optical information about the electromechanical forces of the transducer $T_1, T_2, \ldots, T_n$. The optical fiber F is separately wrapped a number of times, as shown, around each of the transducers $T_1, T_2, \ldots, T_n$ about the transducer axis A and affixed thereon, for example by bonding or wrapping the optical fiber F under tension on transducers $T_1, T_2, \ldots, T_n$. The bonding technique is known in the art, and the scope of the invention is not intended to be limited to any particular type thereof. Moreover, the scope of the invention is not intended to be limited to any particular manner of affixing the optical fiber F to transducers $T_1, T_2, \ldots, T_n$. Each fiber Bragg Grating pair 20, 22; 24, 26; 28, 30 is arranged on a part of the optical fiber F not bonded to the transducers $T_1, T_2, \ldots, T_n$, and the transducers $T_1, T_2, \ldots, T_n$, are arranged between each fiber Bragg Grating pair 20, 22; 24, 26; 28, 30.

The measurement unit 40 responds to the fiber Bragg Grating optical signals, which is received by the detection unit 12, for providing a measurement unit signal containing information about the seismic disturbance. The measurement unit 40 is a complete seismic data acquisition system; and the scope of the invention is not intended to be limited to any particular way for measuring the seismic disturbance based on the seismic data contained in the fiber Bragg Grating optical signals. A person skilled in the art would appreciate how to make the measurement unit 40 for measuring the seismic disturbance based on the fiber Bragg Grating optical signals without undue experimentation. For example, the measurement unit 40 may include a typical microprocessor based architecture, including a microprocessor, a Random Access Memory (RAM), a Read Only Memory (ROM), input/output devices, and a bus for providing data and control signals between these elements. The scope of the invention is also not intended to be limited to any particular hardware and software design of the measurement unit 40, and must perform the signal processing analysis, as discussed below.

Figure 2:
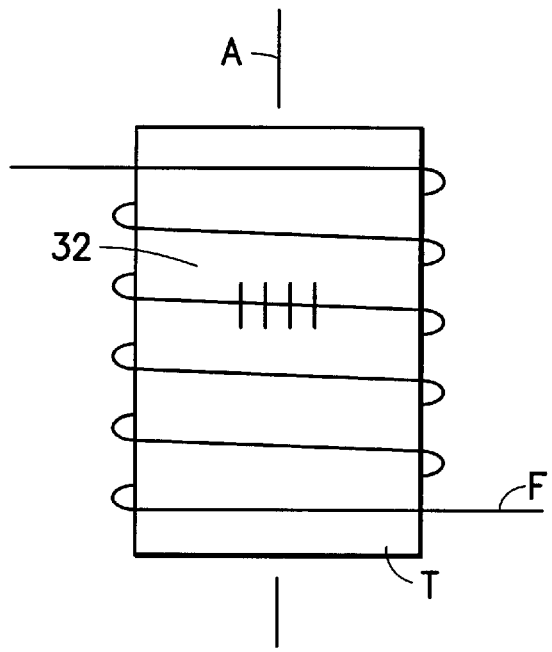
FIG. 2 is a diagram of an alternative embodiment of a part of the seismic sensing system shown in FIG. 1.

FIG. 2 shows a part of an alternative embodiment wherein a single fiber Bragg Grating 32 is separately arranged on a part of the optical fiber F bonded to each transducer T. The single bonded fiber Bragg Grating 32 may be used instead of the unbonded fiber Bragg Grating pairs 20, 22; 24, 26; 28, 30.

The Fiber Bragg Gratings (FBG)

The present invention uses fiber Bragg Gratings 20, 22, 24, 26, 28, 30, 32 as optical converters or sensors, and are well known in the art. The scope of the invention is not intended to be limited to any particular kind or type thereof. It should be understood that any suitable fiber Bragg Grating sensor configuration may be used. For example, the fiber Bragg Gratings can be used for interferometric detection. Alternatively, the fiber Bragg Gratings may be used to form lasing elements for detection, for example by positioning an Ebrium doped length of optical fiber between a pair of fiber Bragg Gratings. It will also be understood by those skilled in the art that the present invention will work equally as well with other types of sensors.

As will be further understood by those skilled in the art, the optical signal processing equipment may operate on a principle of wave-division multiplexing (WDM) as described above wherein each fiber Bragg Grating sensor is utilized at a different wavelength or frequency band of interest. In such WDM embodiments, the fiber Bragg Grating pairs all have different wavelengths, and a broadband light source and detection unit is typically used. Alternatively, the present invention may utilize time-division multiplexing (TDM) for obtaining signals of the same wavelength from multiple independent sensors using time of flight analysis, or any other suitable means for analyzing signals returned from a plurality of fiber Bragg Grating sensors formed in a fiber optic sensor string. In such TDM embodiments, the fiber Bragg Grating pairs have the same wavelengths, and a narrowband light source and detection unit is typically used. Embodiments are also envisioned using time-division multiplexing (TDM) in combination with wave division multiplexing (WDM), wherein some fiber Bragg Grating pairs have the same wavelengths, and some fiber Bragg Grating pairs have different wavelengths.

Moreover, the scope of the invention is also not intended to be limited to only a fiber Bragg Grating. Embodiments are envisioned using other fiber gratings that respond to optical signals, and change some optical parameter or characteristic thereof that can be subsequently sensed and/or detected.

Signal Processing Analysis

A person skilled in the art would appreciate how the optic fiber Bragg Grating sensors are used as sensor elements. The reader is generally referred to U.S. Pat. Ser. Nos. 08/853,762; 08/853,535; and U.S. patent application Ser. No. 08/853,402, all filed May 9, 1997, as well as U.S. patent application Ser. No. 09/016,258, filed Jan. 30, 1998, all assigned to the assignee of the present application, and hereby incorporated by reference. The scope of the invention is not intended to be limited to any particular optical signal processing technique.

As described therein, a data acquisition unit has a broadband light source or laser diode with suitable photo optic couplers. Demodulators and filtering equipment can be used to monitor the Bragg Grating wavelength shift as the grating is subjected to strain. If more than one grating is used, wave division multiplexing techniques can be utilized to discriminate the value or change in wavelength of each individual Bragg Grating.

When such a fiber grating is illuminated, it reflects a narrow band of light at a specified wavelength. However, a measurand, such as strain induced by pressure or temperature, will induce a change in the fiber grating spacing, which changes the wavelength of the light it reflects. The value (magnitude) of the measurand is directly related to the wavelength reflected by the fiber grating and can be determined by detecting the wavelength of the reflected light.

Other optical signal analysis techniques may be used with the present invention such as the necessary hardware and software to implement the optical signal diagnostic equipment disclosed in U.S. Pat. Nos. 4,996,419; 5,361,130; 5,401,956; 5,426,297; and/or 5,493,390, all of which are hereby incorporated by reference.

As is well known in the art, there are various optical signal analysis approaches which may be utilized to analyze return signals from Bragg Gratings. These approaches may be generally classified in the following four categories:

1. Direct spectroscopy utilizing conventional dispersive elements such as line gratings, prisms, etc., and a linear array of photo detector elements or a CCD array.
2. Passive optical filtering using both optics or a fiber device with wavelength-dependent transfer function, such as a WDM coupler.
3. Tracking using a tuneable filter such as, for example, a scanning Fabry-Perot filter, an acousto-optic filter such as the filter described in the above referenced U.S. Pat. No. 5,493,390, or fiber Bragg Grating based filters.
4. Interferometry utilizing well known grating-based or coupler-based scheme using fiber Bragg Grating or coupler pairs for detecting a change in phase as a function of a change in length of the optical fiber.

The particular technique utilized will vary, and may depend on the Bragg Grating wavelength shift magnitude (which depends on the sensor design) and the frequency range of the measurand to be detected. The reader is generally referred to FIGS. 4–8 of U.S. patent application Ser. No. 09/016,258, discussed above, which would be appreciated by a person skilled in the art.

Embodiments are also envisioned using time division multiplexing in which the same wavelength $\lambda_1$ is reflected from different fiber Bragg Grating pairs spaced at different locations. The reflected optical signal is processed using known time division multiplexing signal processing techniques.

Coupler-based Interferometer Seismic Sensing System

FIG. 3 shows a coupler-based interferometer seismic sensing system generally indicated as 50. There are many different coupler-based interferometer systems known in the art, and the description of the embodiment shown in FIG. 3 is provided by way of example only. The scope of the seismic sensing system of the present invention is not intended to be limited to any particular kind of coupler-based interferometer system.

In FIG. 3, the coupler-based interferometer seismic sensing system 50 includes an optical source and detection unit 12, a fiber $F_i$, a coupler $C_1$, a transducer $T_i$, a geophone $G_i$, a coupler $C_2$ and a measurement unit 140. In this embodiment fiber Bragg Gratings are not used. Instead, the optical source and detection unit 12 provides an optical signal on the optical fiber $F_i$ to the coupler $C_1$, which splits the optical signal into two optical signals, one of which is labelled $S\phi_R$ having a reference phase $\phi_R$. The geophone $G_i$ responds to a seismic disturbance, for providing a geophone signal containing information about the seismic disturbance. The transducer $T_i$ responds to the geophone signal, for providing a transducer force containing information about the geophone signal. The optical fiber $F_i$ wrapped around the transducer $T_i$ responds to the transducer force, changes the phase of the other optical signal depending on the change in length of the fiber $F_i$, for providing a transduced optical signal $S\phi_i$ having a transduced phase $\phi_i$ containing information about the transducer force. The coupler $C_2$ combines the optical signal $S\phi_R$ having the reference phase $\phi_R$ and the transduced optical signal $S\phi_i$ having the transduced phase $\phi_i$, for providing a coupler optical signal $S\phi_{Ri}$. In operation, the optical signal $S\phi_R$ and the transduced optical signal $S\phi_i$ interfere with one another. The measurement unit 140 processes the coupler optical signal $S\phi_{Ri}$ using very well known interferometer signal processing techniques, which are described in one or more of the patents incorporated by reference herein. Moreover, as discussed above, the measurement unit 140 is a complete seismic data acquisition system; and the scope of the invention is not intended to be limited to any particular way for measuring the seismic disturbance based on the seismic data contained in the coupler optical signal $S\phi_{Ri}$. FIG. 3 shows the coupler-based interferometer seismic sensing system 50 having one combination of a fiber $F_i$, a coupler $C_1$, a transducer $T_i$, geophone $G_i$, a coupler $C_2$; however, other embodiments are also known in the art.

Figure 5:
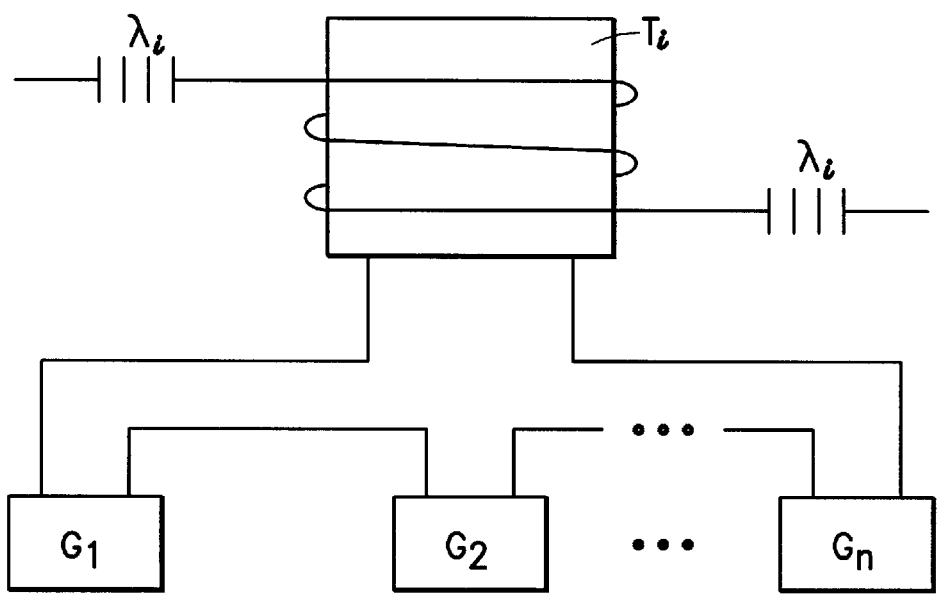
FIG. 5 is a diagram of a serial geophone arrangement for the embodiment of the present invention shown in FIG. 1.
Figure 4:
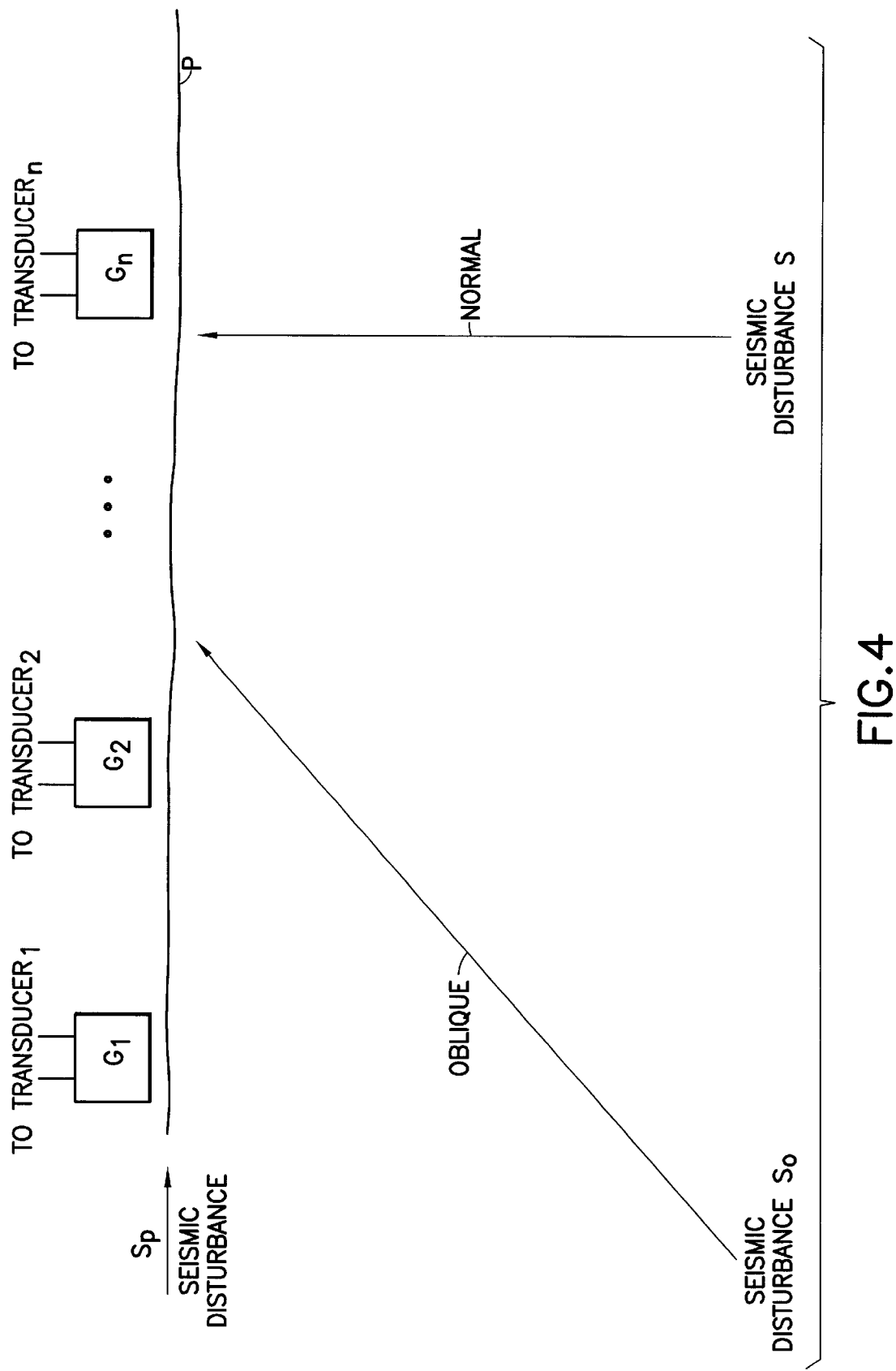
FIG. 4 is a diagram of parallel geophone arrangement embodiment of the present invention shown in FIG. 1.

FIGS. 4 and 5—Deployments of an Array of Geophones

FIG. 4 shows a deployment of an array of geophones for connecting in a parallel relationship with respective transducers (not shown). The weighted signal processing techniques may include summing the signals from the geophones $G_1, G_2, \ldots, G_n$ on a plane P of deployment with the following equation:

$$S = w(G_1)*s_1 + w(G_2)*s_2 + \ldots + w(G_n)*s_n,$$

where $w(G_i)$ is a weighting function for a geophone $G_i$, and $s_i$ is the electrical voltage signal from a geophone $G_i$. The weighting function can be used to determine the directivity of the seismic disturbance, such as an oblique seismic disturbance $S_O$ transmitted at an angle with respect to the plane P of deployment of the geophones $G_1, G_2, \ldots, G_n$ or an orthogonal seismic disturbance $S_N$ transmitted normal to the plane P of deployment of the geophones $G_1, G_2, \ldots, G_n$, or to average out the perturbations from the seismic disturbance $S_P$ moving parallel to the plane P of deployment of the geophones $G_1, G_2, \ldots, G_n$.

FIG. 5 shows another deployment of an array of geophones for connecting in a series relationship with a single transducer $T_i$. The series relationship of geophones $G_1, G_2, \ldots, G_n$ may also be used in combination with embodiments show in FIGS. 1–4 and 6–7.

Figure 6:
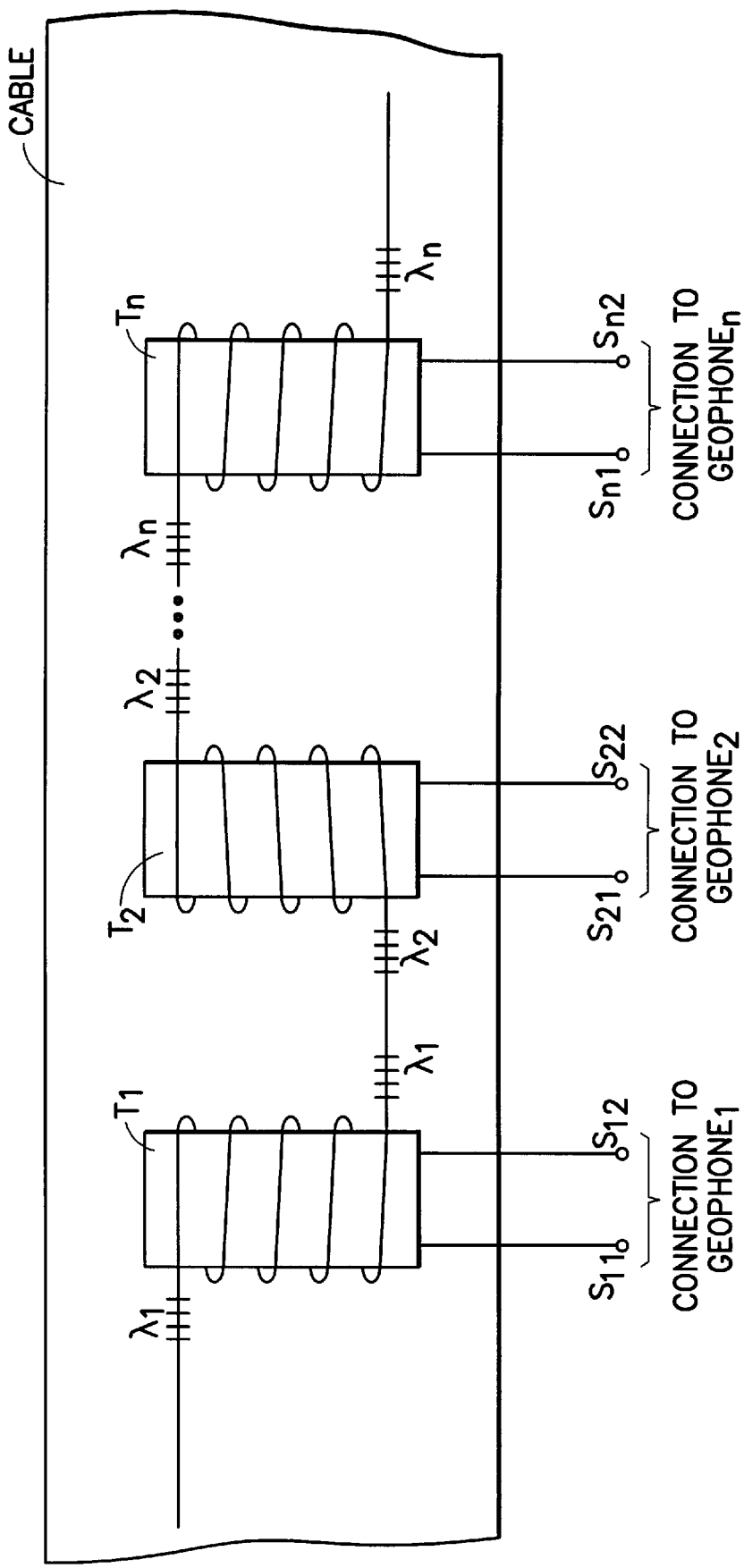
FIG. 6 is a diagram of a cable housing for the seismic sensing system shown in FIG. 1.

FIG. 6—A Cable Housing Arrangement

FIG. 6 shows a cable for housing the geophone connections, the transducers, and the optical fiber to permit a much simpler deployment of the seismic sensing system.

Figure 7:
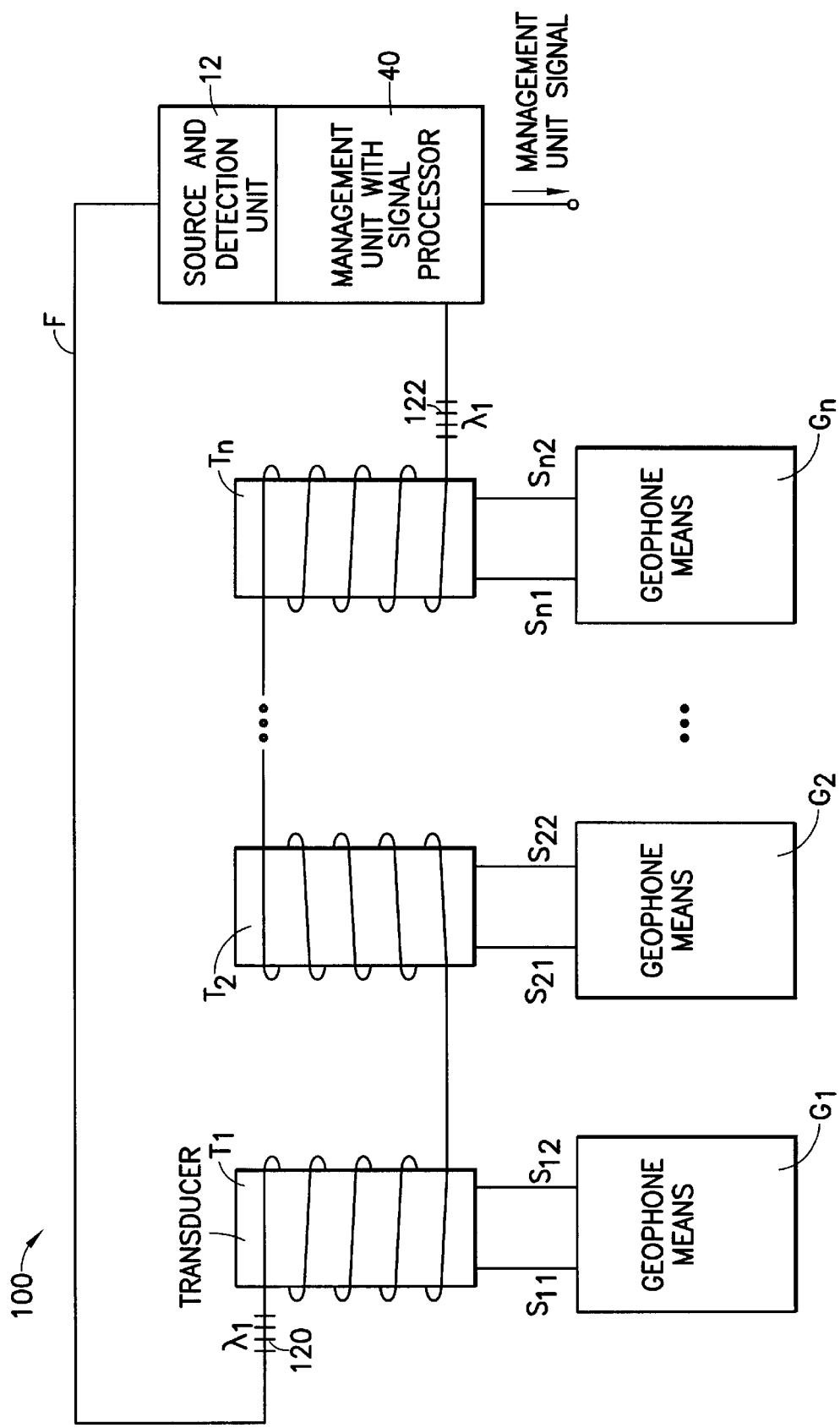
FIG. 7 is a diagram of another embodiment having a serial transducer arrangement.

FIG. 7—Series Arrangement of Transducers

FIG. 7 shows a seismic sensing system generally indicated as 100. The parts in FIG. 7 that are similar to the parts in FIG. 1 are similarly labelled and not described with respect to FIG. 7. The seismic sensing system 100 has a series arrangement of transducers $T_1, T_2, \ldots, T_n$ with one fiber Bragg Grating pair 120, 122 at each end thereof. In operation, expansion and contraction of the transducers $T_1, T_2, \ldots, T_n$, combine to change the length of the optical fiber, which in turn changes the phase of the optical signal.

Advantages Over Existing Seismic Sensing Systems

Embodiment are envisioned wherein measurements 64 or more channels (geophone arrays) can be made using a single fiber. Tens of optical fibers can be bundled in a cable. The seismic sensing system of the present invention does not require recording units RU and data acquisition units DAU in the Norris patent discussed above which use batteries and are heavy.

Since seismic arrays can cover large areas, the low losses in optical fiber based systems become important and insure the fidelity of the signals received at a central processing station.

Because of this, the fiber optic seismic system of the present invention, therefore, is much easier and cheaper to use than the existing seismic sensing systems. For applications in wells where temperatures can exceed those acceptable for the use of electronics, the geophone array described would provide a potentially more robust sensing system because no active element to condition and telemeter the geophone signals to a surface data receiving system.

Scope of the Invention

Although the invention has been described and illustrated with respect to exemplary embodiments thereof, the foregoing and various other additions and omissions may be made therein and thereto without departing from the spirit and scope of the present invention.

We claim:

1. A seismic sensing system, comprising:
   a sensor, responsive to a seismic disturbance, for providing a sensor signal containing information about the seismic disturbance;
   a transducer having a transducer axis, responsive to the sensor signal, for providing a mechanical transducer force applied radially with respect to the transducer axis and containing information about the sensor signal;
   an optical source for providing an optical signal;
   an optical fiber being wrapped a number of times around the transducer about the transducer axis, responsive to the mechanical transducer force, for changing an optical parameter or characteristic of the optical signal in relation to a change in length of the optical fiber that depends on the number of times the optical fiber is wrapped around the transducer, and providing a transduced optical signal containing information about the mechanical transducer force from the transducer; and
   a measurement unit, responsive to the transduced optical signal, for providing a measurement unit signal containing information about the seismic disturbance.

2. A seismic sensing system according to claim 1, wherein the transducer is a cylindrical piezoelectric, magnetostrictive or electrostrictive transducer.

3. A seismic sensing system according to claim 2, wherein the optical fiber is affixed on the piezoelectric, magnetostrictive or electrostrictive transducer.

4. A seismic sensing system according to claim 2, wherein the optical fiber is bonded to the piezoelectric, magnetostrictive or electrostrictive transducer;
   wherein the optical fiber has a fiber Bragg Grating pair arranged on a part thereof not bonded to the transducer; and
   wherein the piezoelectric, magnetostrictive or electrostrictive transducer is arranged between the fiber Bragg Grating pair.

5. A seismic sensing system according to claim 2, wherein the optical fiber has one fiber Bragg Grating arranged on a part thereof bonded to the piezoelectric transducer.

6. A seismic sensing system according to claim 1, wherein the sensor is a geophone or a hydrophone.

7. A seismic sensing system according to claim 1, wherein the seismic sensing system is a coupler-based interferometer seismic sensing system.

8. A seismic sensing system according to claim 7, wherein the optical source and detection unit (12) provides an optical signal on the fiber ($F_i$);
   wherein the seismic sensing system further comprises a coupler ($C_1$) that responds to the optical signal, for providing two optical signals, one optical signal ($S\phi_R$) of which has a reference phase ($\phi_R$);
   wherein the sensor is a geophone ($G_i$) that responds to the seismic disturbance, for providing the sensor signal in the form of a geophone signal containing information about the seismic disturbance;
   wherein the transducer $T_i$ responds to the geophone signal, for providing the transducer force containing information about the geophone signal;
   wherein the optical fiber (F), responds to the transducer force, changes the phase of the optical signal depending on the change in length of the fiber ($F_i$), for providing a transduced optical signal ($S\phi_i$) having a transduced phase ($\phi_i$) containing information about the transducer force;
   wherein the seismic sensing system further comprises a coupler ($C_2$) that combines the optical signal ($S\phi_R$) and the transduced optical signal ($S\phi_i$), for providing a coupled optical signal ($S\phi_{Ri}$); and
   wherein the measurement unit (140) processes the coupled optical signal ($S\phi_{Ri}$), for providing the measurement unit signal containing information about the seismic disturbance.

9. A seismic sensing system according to claim 1, wherein the measurement unit performs signal processing on the transduced optical signal using direct spectroscopy utilizing conventional dispersive elements such as line gratings or prisms, and a linear array of photo detector elements or a CCD array.

10. A seismic sensing system according to claim 1, wherein the measurement unit performs signal processing on the transduced optical signal using passive optical filtering using both optics or a fiber device with wavelength-dependent transfer function, such as a WDM coupler; or wherein the measurement unit performs signal processing on the transduced optical signal using tracking with a tuneable filter such as, for example, a scanning Fabry-Perot filter, an acousto-optic filter or fiber Bragg Grating based filters.

11. A seismic sensing system according to claim 1, wherein the measurement unit performs signal processing on the transduced optical signal using interferometry utilizing a grating-based or coupler-based scheme processing signals from fiber Bragg Grating or coupler pairs for detecting a change in phase as a function of a change in length of the optical fiber.

12. A seismic sensing system according to claim 3, wherein the optical fiber is wrapped under tension on the piezoelectric, magnetostrictive or electrostrictive transducer.

13. A seismic sensing system according to claim 3, wherein the optical fiber is bonded to the piezoelectric, magnetostrictive or electrostrictive transducer.

14. A seismic sensing system according to claim 1, wherein the amplified change in length of the optical fiber causes a change in the phase or wavelength of the optical signal being transmitted or reflected through the optical fiber.

15. A seismic sensing system according to claim 1, wherein the measurement unit uses a time division multiplexing scheme for signal processing.

16. A seismic sensing system according to claim 1, wherein the measurement unit uses a wavelength division multiplexing scheme for signal processing.

17. A seismic sensing system according to claim 1, wherein the measurement unit uses a combination of a wavelength division multiplexing and time division multiplexing scheme for signal processing.

18. A seismic sensing system (10) using optical fiber, comprising:

a plurality of geophones ($G_1, G_2, \ldots, G_n$), responsive to a seismic disturbance, for providing a plurality of geophone electric signals ($S_{11}, S_{12}; S_{21}, S_{22}; \ldots; S_{n1}, S_{n2}$) containing information about the seismic disturbance;

a plurality of transducers ($T_1, T_2, \ldots, T_n$) responsive to the plurality of geophone electric signals ($S_{11}, S_{12}; S_{21}, S_{22}; \ldots; S_{n1}, S_{n2}$), for providing a plurality of electromechanical transducer forces containing information about the plurality of geophone electric signals;

an optical source and detection unit (12) for providing an optical source signal;

an optical fiber (F) having fiber Bragg Grating pairs therein (20, 22; 24, 26; 28, 30) each with a respective wavelength ($\lambda_1, \lambda_2, \ldots, \lambda_n$), responsive to the plurality of electromechanical transducer forces, for changing an optical parameter or characteristic of the optical signal depending on the change in length of the optical fiber and providing a plurality of fiber Bragg Grating optical signals containing multiplexed information about the plurality of electromechanical transducer forces; and a measurement unit (40), responsive to the plurality of fiber Bragg Grating optical signals, for providing a measurement unit signal containing information about the seismic disturbance.

19. A seismic sensing system according to claim 18, wherein the plurality of transducers include one or more piezoelectric, magnetostrictive or electrostrictive transducers.

20. A seismic sensing system according to claim 19, wherein the plurality of geophones include an array of geophones so each geophone is connected in a parallel relationship with a respective transducer in the plurality of piezoelectric, magnetostrictive or electrostrictive transducers.

21. A seismic sensing system according to claim 19, wherein the optical fiber is separately wrapped around each of the plurality of piezoelectric, magnetostrictive or electrostrictive transducers and affixed thereon.

22. A seismic sensing system according to claim 19, wherein the optical fiber is bonded on each of the plurality of piezoelectric, magnetostrictive or electrostrictive transducers;

wherein the fiber Bragg Grating pairs are arranged on a part of the optical fiber not bonded to each of the plurality of transducers; and wherein each of the plurality of piezoelectric transducer is arranged between the fiber Bragg Grating pairs.

23. A seismic sensing system according to claim 18, wherein the seismic sensing system further comprises a cable for housing the plurality of geophone connections, the plurality of transducers, and the optical fiber.

24. A seismic sensing system according to claim 18, wherein the plurality of geophones include an array of geophones connected in a series relationship with a single transducer in the plurality of piezoelectric, magnetostrictive or electrostrictive transducers.

25. A seismic sensing system according to claim 18, wherein the amplified change in length of the optical fiber causes a change in the phase or wavelength of the optical signal being transmitted or reflected through the optical fiber.

26. A seismic sensing system, comprising:

a geophone, responsive to a physical disturbance, for providing a geophone voltage signal containing information about the seismic disturbance;

a transducer having a transducer axis, responsive to the geophone voltage signal, for providing an electromechanical force applied radially with respect to the transducer axis and containing information about the geophone voltage signal;

means for providing an optical signal;

an optical fiber having at least one fiber Bragg Grating or fiber Bragg Grating pair therein and being wrapped a number of times around the transducer about the transducer axis, responsive to the electromechanical force from the transducer, for changing an optical parameter or characteristic of the optical signal in relation to a change in length of the optical fiber that depends on the number of times the optical fiber is wrapped around the transducer, and providing a fiber Bragg Grating optical signal containing information about the electromechanical force from the transducer; and signal processor means, responsive to the fiber Bragg Grating optical signal, for providing a signal processor signal containing information about the seismic disturbance.

27. A seismic sensing system according to claim 26, wherein the transducer is a piezoelectric, magnetostrictive or electrostrictive transducer.

* * * * *

UNITED STATES PATENT AND TRADEMARK OFFICE
CERTIFICATE OF CORRECTION

PATENT NO. : 6,252,656 B1  Page 1 of 1
DATED : June 26, 2001
INVENTOR(S) : Wu et al.

It is certified that error appears in the above-identified patent and that said Letters Patent is hereby corrected as shown below:

<u>Title page,</u>
Item [57] ABSTRACT,
Line 8, please delete "though" and insert -- through --.

<u>Column 1,</u>
Line 46, please delete "though" and insert -- through --.

Signed and Sealed this

Twenty-sixth Day of March, 2002

Attest:

JAMES E. ROGAN
*Attesting Officer*  *Director of the United States Patent and Trademark Office*